(12) United States Patent
Smith

(10) Patent No.: US 9,909,336 B1
(45) Date of Patent: Mar. 6, 2018

(54) IDENTITY SHIELDING DEVICE

(71) Applicant: Daryl A. Smith, Los Angeles, CA (US)

(72) Inventor: Daryl A. Smith, Los Angeles, CA (US)

( * ) Notice: Subject to any disclaimer, the term of this patent is extended or adjusted under 35 U.S.C. 154(b) by 0 days.

(21) Appl. No.: 15/082,734

(22) Filed: Mar. 28, 2016

Related U.S. Application Data

(63) Continuation-in-part of application No. 14/207,967, filed on Mar. 13, 2014, now Pat. No. 9,295,310.

(60) Provisional application No. 61/784,244, filed on Mar. 14, 2013.

(51) Int. Cl.
| | |
|---|---|
| *E04H 15/28* | (2006.01) |
| *A45B 23/00* | (2006.01) |
| *A45B 25/18* | (2006.01) |
| *G03B 15/06* | (2006.01) |

(52) U.S. Cl.
CPC .............. *E04H 15/28* (2013.01); *A45B 23/00* (2013.01); *A45B 25/18* (2013.01); *G03B 15/06* (2013.01)

(58) Field of Classification Search
CPC .............................. E04H 15/28; E04H 15/06
USPC ... 135/121, 151, 152, 153, 88.01, 88.13, 99, 135/117, 908, 912, 902, 903; 160/309, 160/310; 256/25
See application file for complete search history.

(56) References Cited

U.S. PATENT DOCUMENTS

| | | | |
|---|---|---|---|
| 315,994 A | 4/1885 | Ball | |
| 1,581,843 A | 4/1926 | Little, Jr. | |
| 1,714,218 A | 5/1929 | Frost | |
| 1,803,626 A * | 5/1931 | Lasley | E04H 1/1244 135/118 |
| 1,833,004 A * | 11/1931 | Spiro | A45B 19/00 135/15.1 |
| 2,279,150 A | 4/1942 | Thom | |
| 2,594,410 A * | 4/1952 | Feldpausch | A01M 31/00 135/141 |
| 2,841,160 A | 7/1958 | Dewispelere | |
| 3,151,621 A * | 10/1964 | Jackson | A45B 23/00 135/16 |
| 3,498,306 A * | 3/1970 | Edelking | A45B 25/18 135/33.2 |
| 4,601,301 A | 7/1986 | Hermanson | |
| 5,368,055 A | 11/1994 | Johnson et al. | |
| 5,487,401 A | 1/1996 | Johnson et al. | |
| D418,671 S * | 1/2000 | Tsai | D3/6 |
| 6,694,538 B1 | 2/2004 | Jones | |
| 7,581,554 B2 * | 9/2009 | Glasser | A45B 25/14 135/15.1 |

(Continued)

OTHER PUBLICATIONS

Umbrella : Funny, Bizarre, Amazing Pictures & Videos, N.p., n.d. Web. Aug. 8, 2014. <http://www.foundshit.com/tag/umbrella>; posted Feb. 4, 2011.

(Continued)

*Primary Examiner* — Noah Chandler Hawk
(74) *Attorney, Agent, or Firm* — Vorys, Sater, Seymour and Pease LLP

(57) ABSTRACT

Disclosed is an identity shielding device to be used when notable persons do not wish to have their photograph taken. In one embodiment, an identity shielding device has a shaft with first and second ends; a sliding splint slideably attached to the shaft; and a foldable framework attached to the sliding splint and the first end of the shaft, the framework being open at both ends, and having a collapsible shield affixed to the framework. The foldable framework includes both ribs and fasteners.

19 Claims, 20 Drawing Sheets

(56) References Cited

U.S. PATENT DOCUMENTS

| | | | |
|---|---|---|---|
| 8,857,453 B2* | 10/2014 | Souma | A45B 25/143 |
| | | | 135/20.3 |
| 2008/0283735 A1 | 11/2008 | Verenkoff | |
| 2010/0170545 A1* | 7/2010 | Yang | A45B 19/04 |
| | | | 135/20.3 |
| 2010/0307548 A1 | 12/2010 | Cain et al. | |
| 2010/0323608 A1 | 12/2010 | Sanhedral et al. | |
| 2012/0056546 A1 | 3/2012 | Harvey | |
| 2013/0306118 A1* | 11/2013 | Souma | A45B 25/143 |
| | | | 135/16 |

OTHER PUBLICATIONS

Amazon.com: Big Mouth Toys Paparazzi Shades: Toys & Games. N.p., n.d. Web. Jun. 11, 2013. <http://www.amazon.com/dp/B004NM6N98/?tag=051-20>.

* cited by examiner

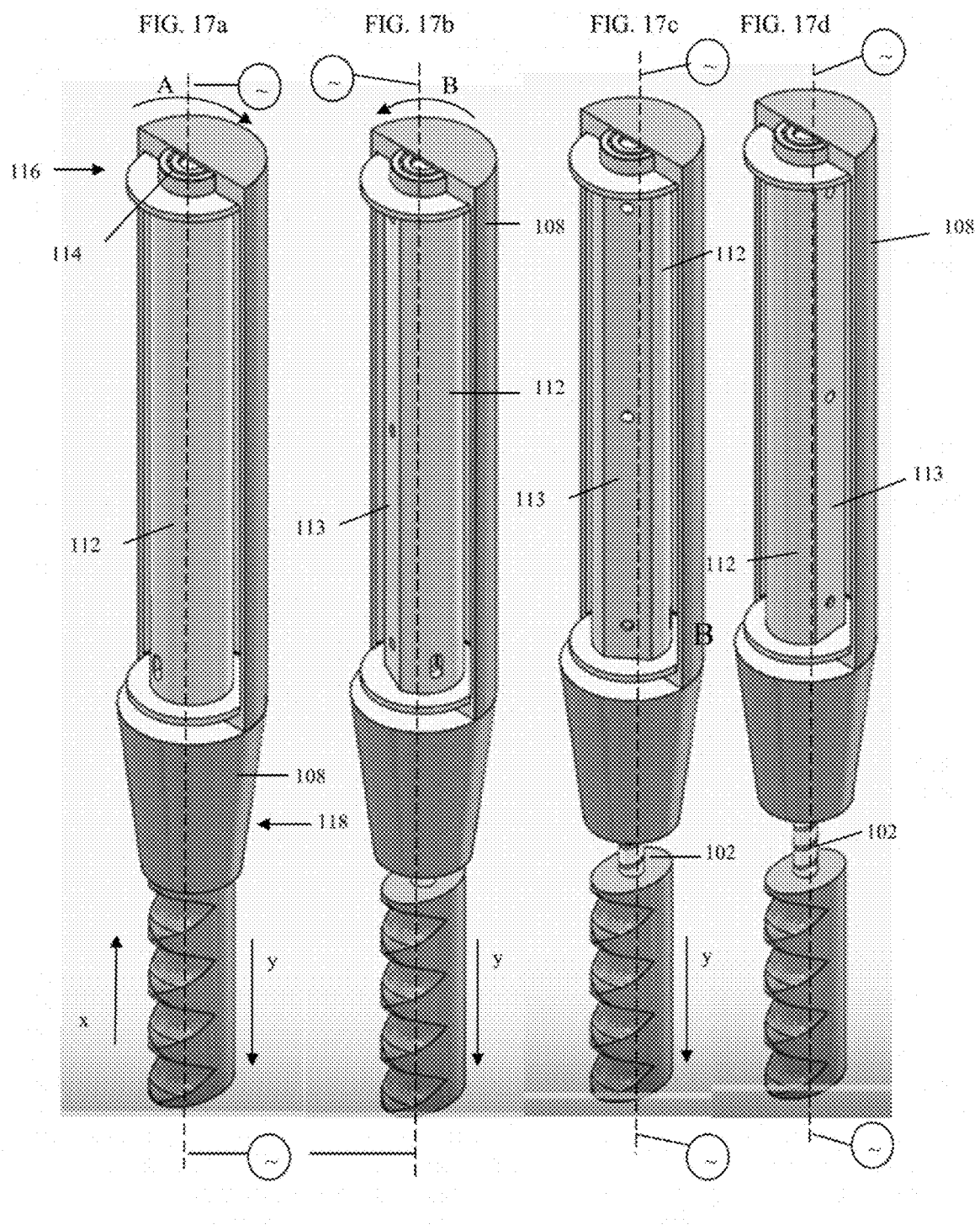

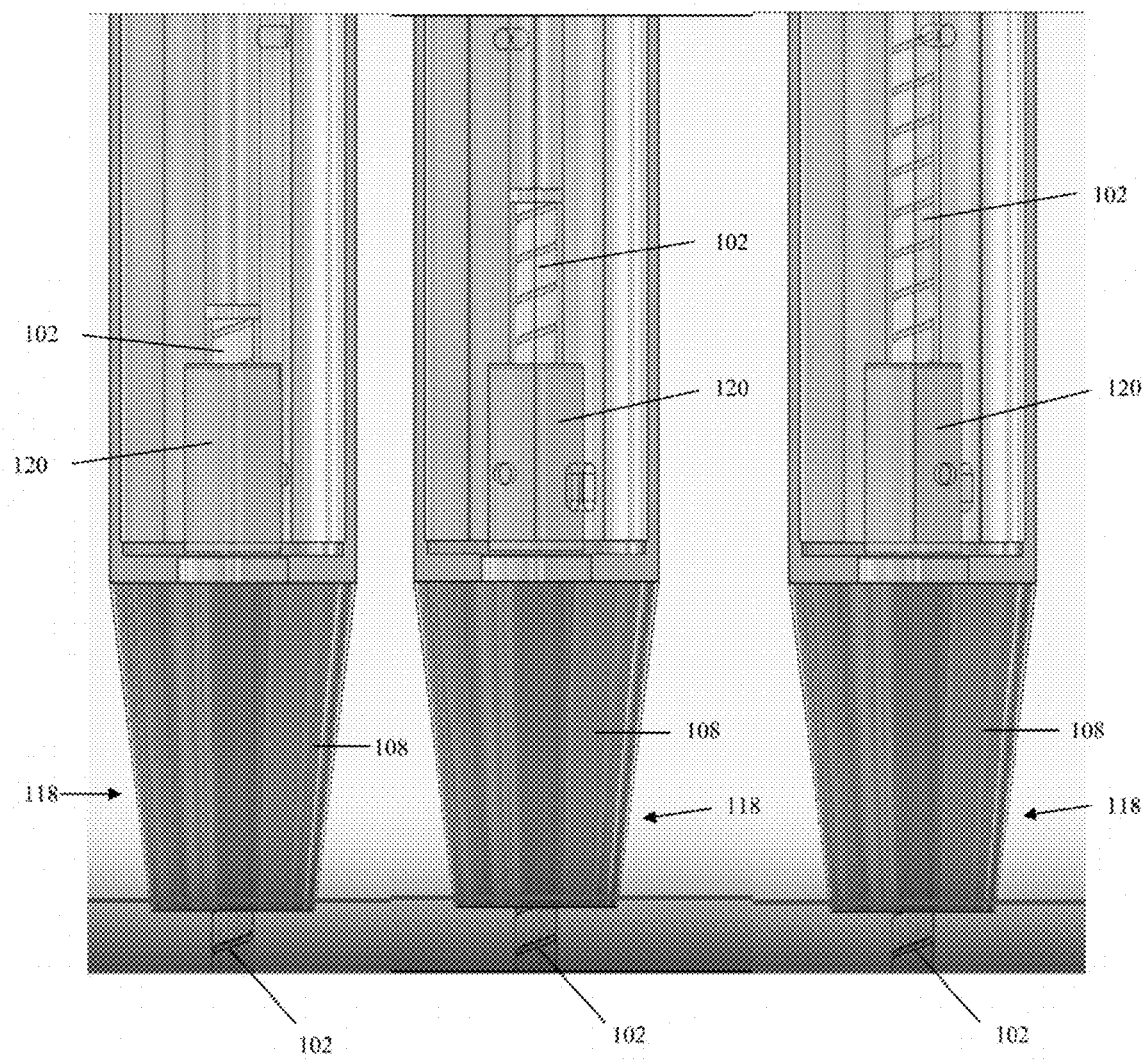

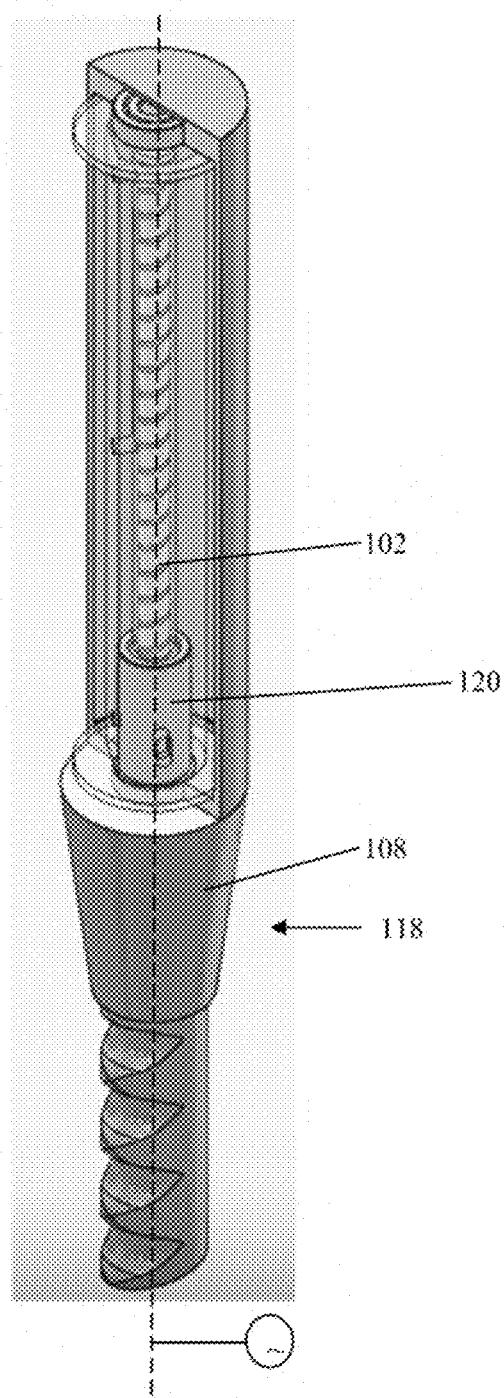

IDENTITY SHIELDING DEVICE

CROSS-REFERENCE TO RELATED APPLICATIONS

This Continuation-In-Part application claims priority to and the benefit of U.S. patent application Ser. No. 14/207,967, filed Mar. 13, 2014, and U.S. Provisional Application No. 61/784,244, filed Mar. 14, 2013, the disclosures of which are incorporated herein in their entirety by reference.

BACKGROUND

Notable subjects, such as celebrities, politicians, accident victims, victims of crimes, criminal suspects, and the like, may find his or her picture is frequently taken without consent. Unfortunately, these notable subjects may have little recourse available after the picture is taken. Further, while the notable subject may be able to stop one photographer from taking his picture, he may be unable to stop many photographers from taking his photograph. And, he may be unable to stop one or many photographers from taking his picture at long range while using devices such as telephoto lenses, or while shooting from an elevated vantage point. Therefore, a device which inhibits one or many photographers' ability to take a picture of the notable subject is desirable.

Some devices, for example, the inventions of U.S. application Ser. Nos. 12/807,530, 12/308,525, and 11/798,446 interfere with a photographer's camera and subsequent ability to take a photograph. However, it is not always desirable to use the systems typified by these inventions because they may interfere with the user's own electronic devices or his ability to move freely without distraction. Thus, a device with inhibits a photographer's ability to take an unwanted picture of a notable subject while allowing the user to continue to use his electronic devices and move freely without distraction is desirable.

SUMMARY

In one embodiment, an identity shielding device is described, the device comprising a shaft having first and second ends, a framework not parallel to the shaft and attached nearer to one end of the shaft, the framework defining an interior space and comprising an open top and an open bottom, and a shield capable of being affixed to the framework.

In a second embodiment, an identity shielding device is described, the device comprising a shaft having first and second ends wherein a cap is affixed to the first end and a handle affixed to the second end, a sliding splint slideably attached to the shaft, a framework not parallel to the shaft attached to the sliding splint and the cap, the framework defining an interior space and comprising an open top and an open bottom, and a shield capable of being affixed to the framework.

In a third embodiment, an identity shielding device is described, the device comprising a shaft having first and second ends wherein a cap is affixed to the first end and a handle is affixed to the second end, a sliding splint slideably attached to the shaft, and a plurality of ribs, the ribs attached to each other by a plurality of fasteners, the plurality of ribs and fasteners thereby forming a framework, the framework being not parallel to the shaft and being attached to the sliding splint and the cap, the framework defining an interior space and comprising an open top and an open bottom, and having a shield capable of being affixed to the framework.

In a fourth embodiment, an identity shielding device is described, the device comprising a shaft having an upper region and a lower region, a framework having a retracted position and an extended position, said framework creating a substantially closed periphery defining an interior space comprising an open top and an open bottom when in its extended position, a means for attaching said framework to said shaft in a non-parallel arrangement, a means for moving said framework between its retracted and extended position, and a shield capable of covering said framework in its extended position.

BRIEF DESCRIPTION OF THE DRAWINGS

FIGS. 17a-17g are cut-away isometric illustrations of the alternate embodiment of the identity shielding device's housing, and depict the rotor disposed inside the housing and oriented at incremental radial positions with respect to the shaft's corresponding incremental axial movement.

FIGS. 18a-18c are cut-away side view illustrations of the alternate embodiment of the identity shielding device's housing without the rotor, and depict the rotor hub's interaction with the shaft.

FIG. 19 is a cut-away isometric illustration of the alternate embodiment of the identity shielding without the rotor, wherein the device is in a closed position.

DETAILED DESCRIPTION

FIGS. 1-7 generally show a model of the identity shielding device 10. The model is used for illustration purposes and may not be to scale. FIGS. 8-12 generally show an alternate embodiment of the identity shielding device 10.

Figure 1:
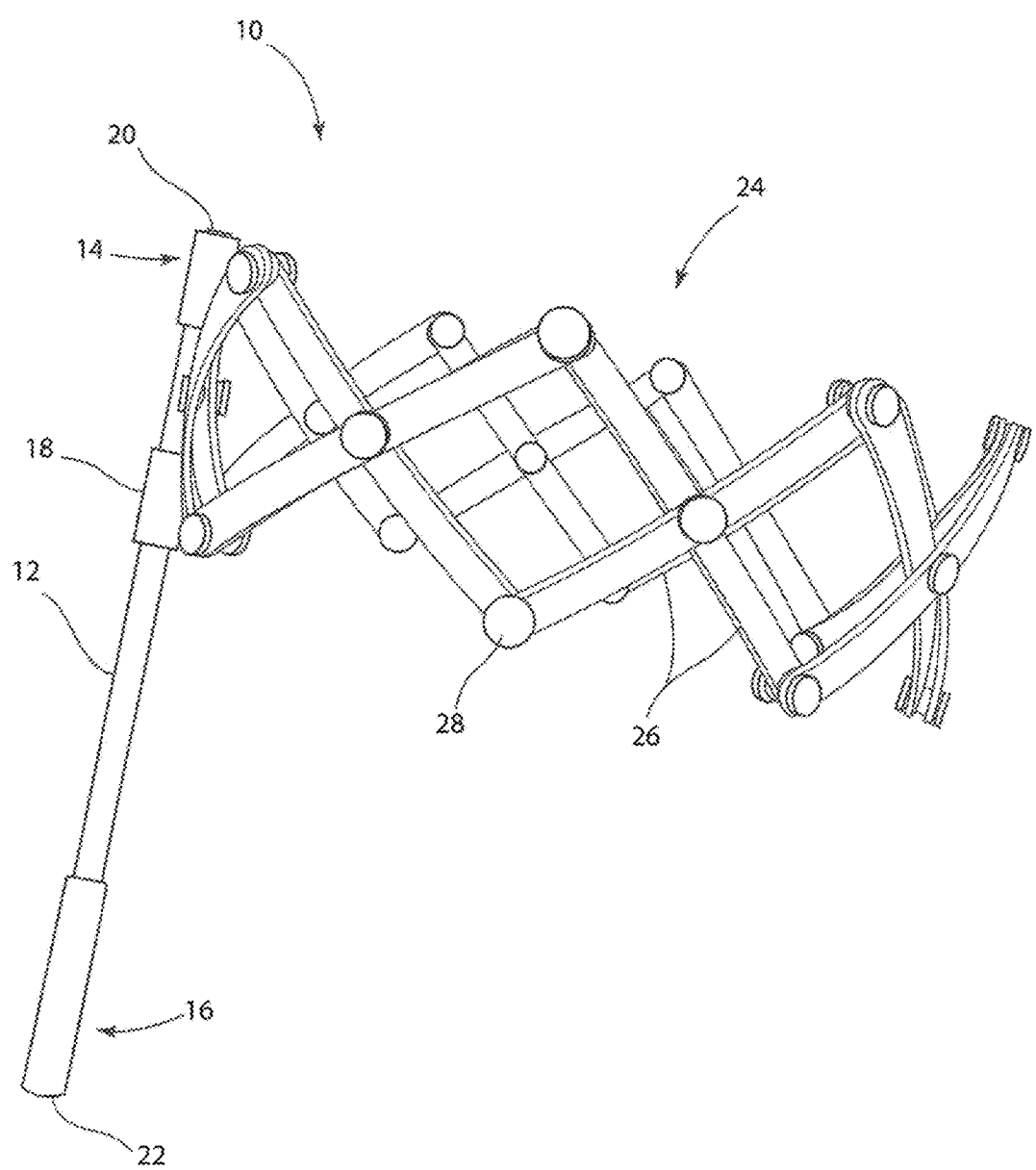
FIG. 1 is a side view of the identity shielding device with the framework.

FIG. 1 shows a side view of the identity shielding device 10. The identity shielding device 10 has a shaft 12 with a first end 14 and a second end 16. A sliding splint 18 is slideably attached to the shaft 12. The sliding splint 18 is generally attached to allow free motion of the sliding splint 18 along a length of the shaft 12. In some embodiments, a depressible flange (not shown) may be located midway about the shaft 12 to aid the user in temporarily positioning the sliding splint 18 on the shaft 12. In other embodiments, the flange may have releasable compression means to aid the user in temporarily positioning the sliding splint 18 on the shaft 12.

With continued reference to FIG. 1, in some embodiments first end 14 has a cap 20 affixed to the shaft 12. In some embodiments, second end 16 has a handle 22 affixed to the shaft 12. Some embodiments of the current invention may feature either the cap 20 or the handle 22, some embodiments of the current may feature both the cap 20 and the handle 22, and yet other embodiments may feature neither the cap 20, nor the handle 22.

FIG. 1 shows a framework 24 of the identity shielding device 10. In this exemplary embodiment, the framework 24 is foldable and shown in an open, or extended position. Foldable framework 24 is attached to the first end 14 of the shaft 12 or may alternatively be attached to the cap 20 or to the sliding splint 18 of the identity shielding device 10. Further, a first end of the foldable framework 24 may be attached in a first position to the sliding splint 18 and in a fixed second position to the shaft 12.

Figure 4:
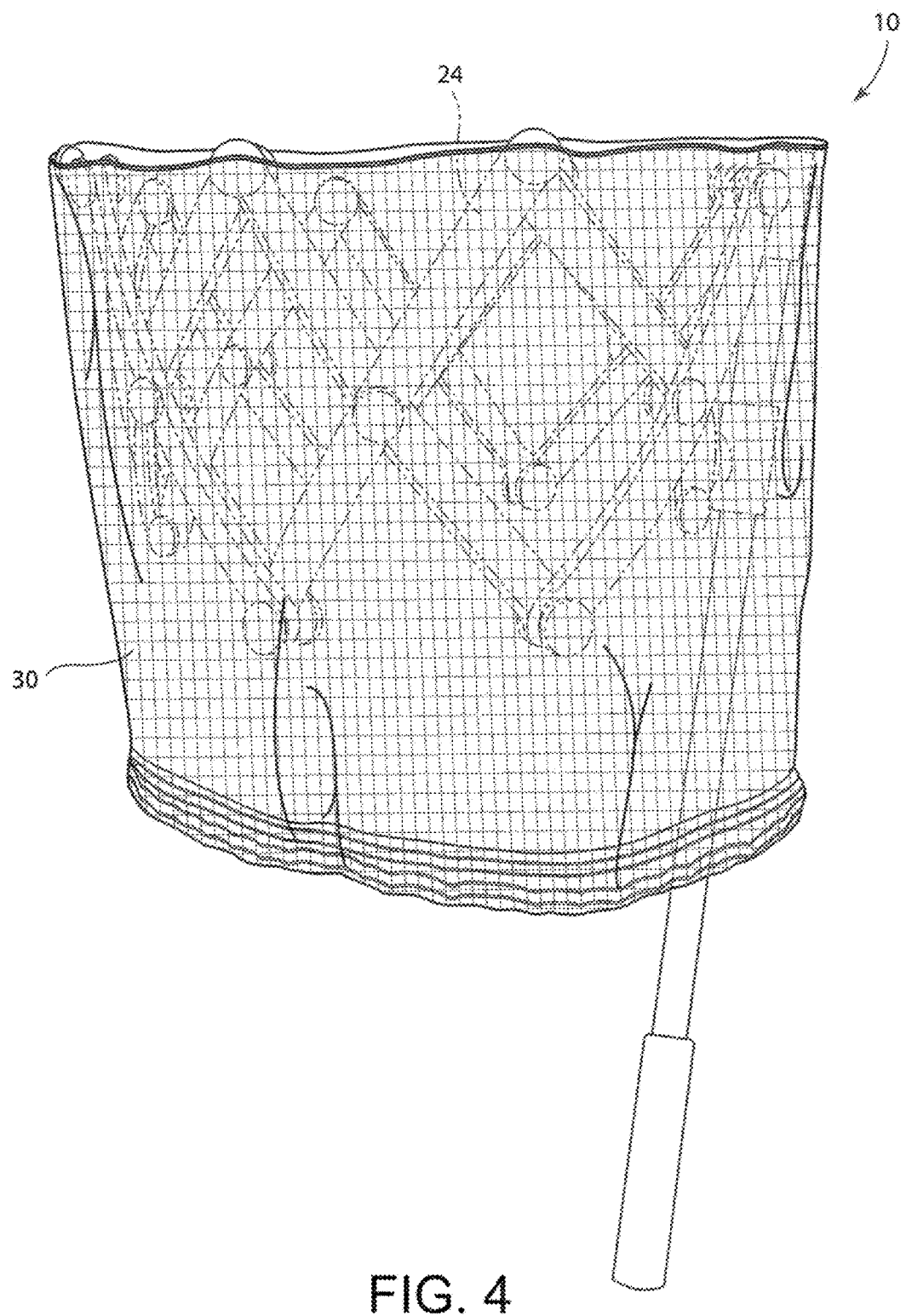
FIG. 4 is a side view of the identity shielding device with the shield affixed to the identity shielding device.
Figure 5:
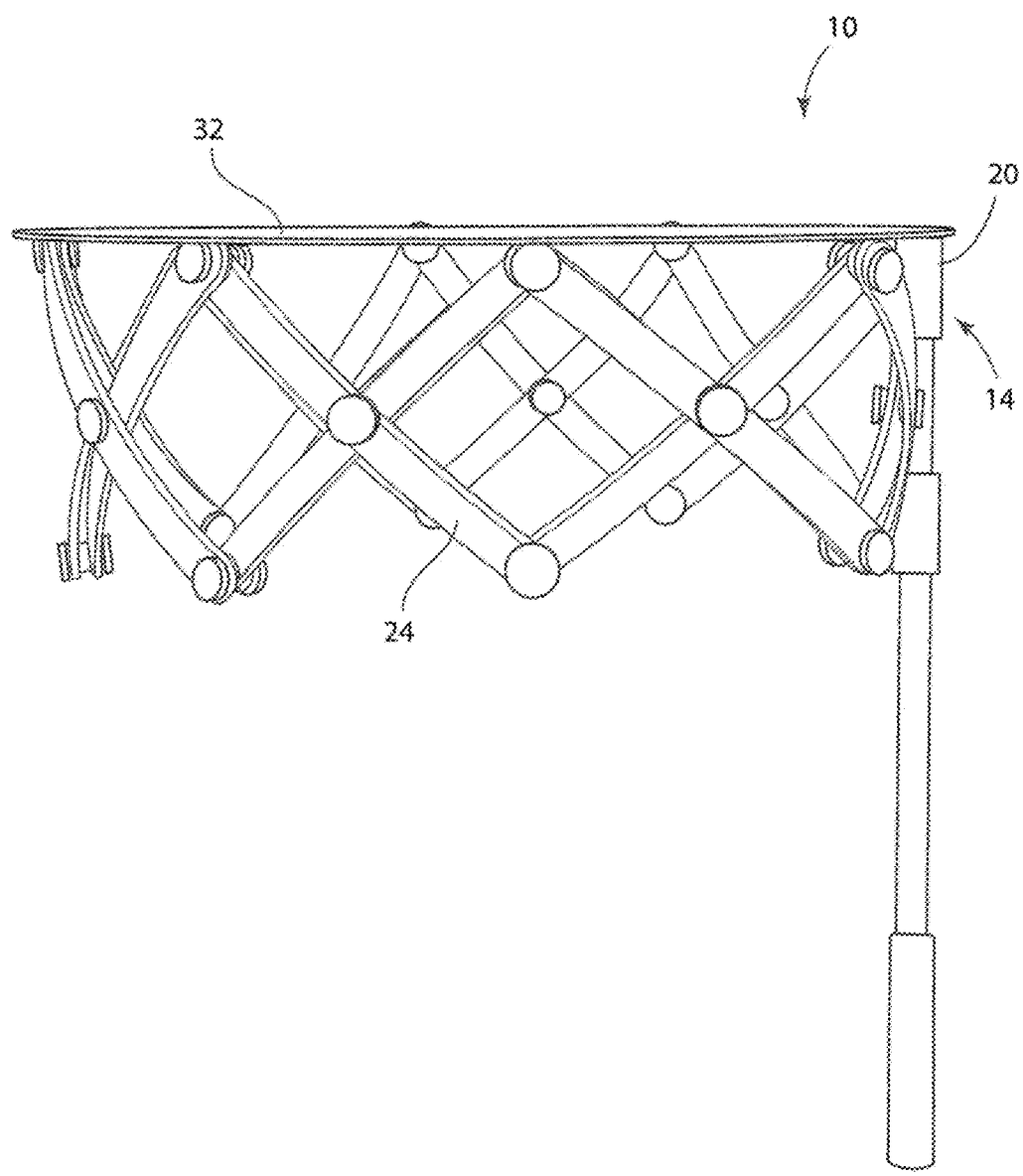
FIG. 5 is a side view of the identity shielding device with the canopy affixed to the end of the framework adjacent the first end of the identity shielding device.
Figure 6:
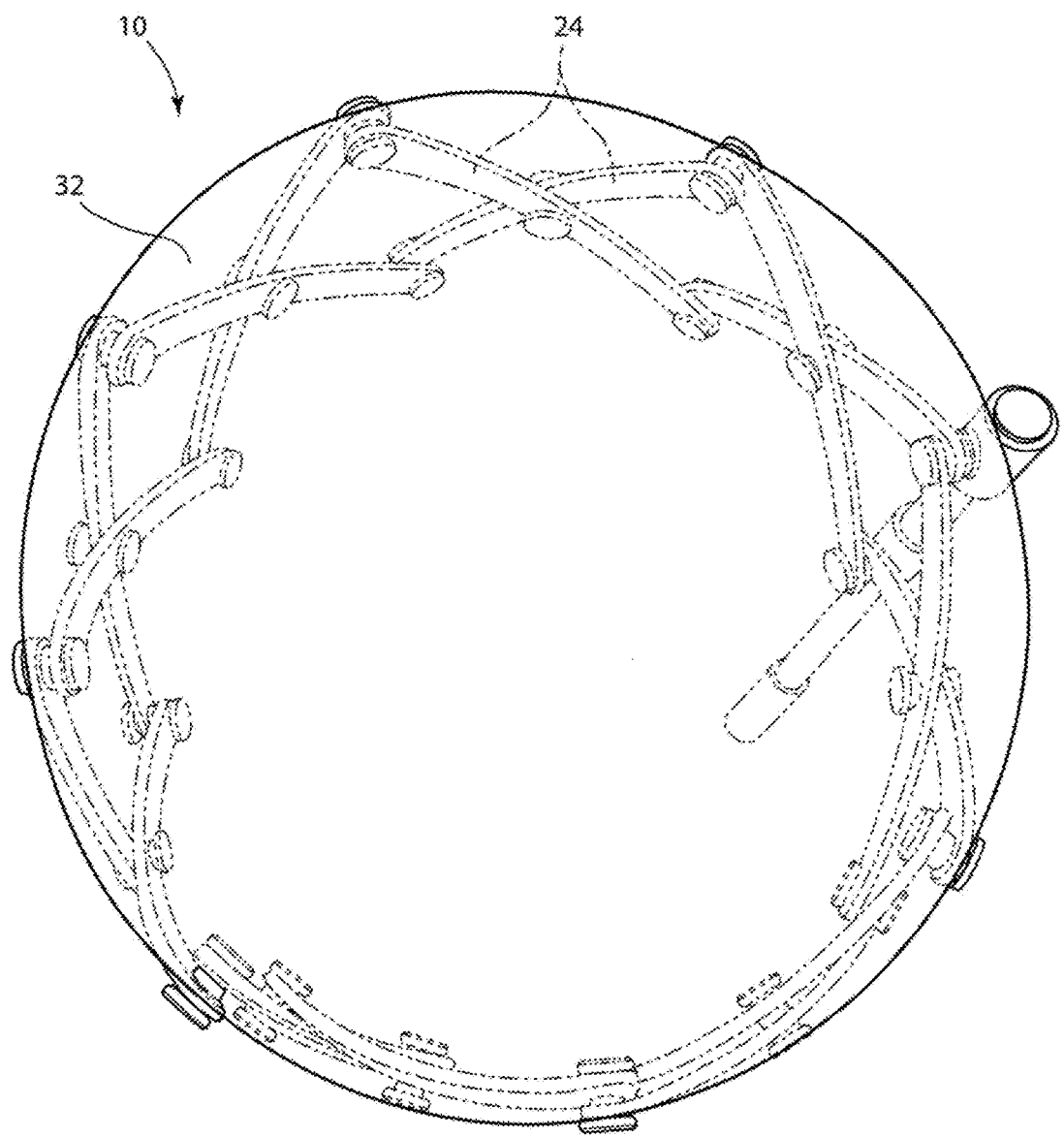
FIG. 6 is a top view of the identity shielding device with the canopy affixed to the end of the framework adjacent the first end of the identity shielding device.

As shown in FIG. 4, foldable framework 24 has a shield 30 attached to the framework 24. In exemplary embodiments, the shield 30 may either be rigid or collapsible. As shown in FIGS. 5-6, in alternate embodiments a canopy 32 may be affixed to the end of the foldable framework 24 adjacent the first end 14 or cap 20. Collapsible shield 30 and canopy 32 may be used together or separately, as the user desires.

Figure 2:
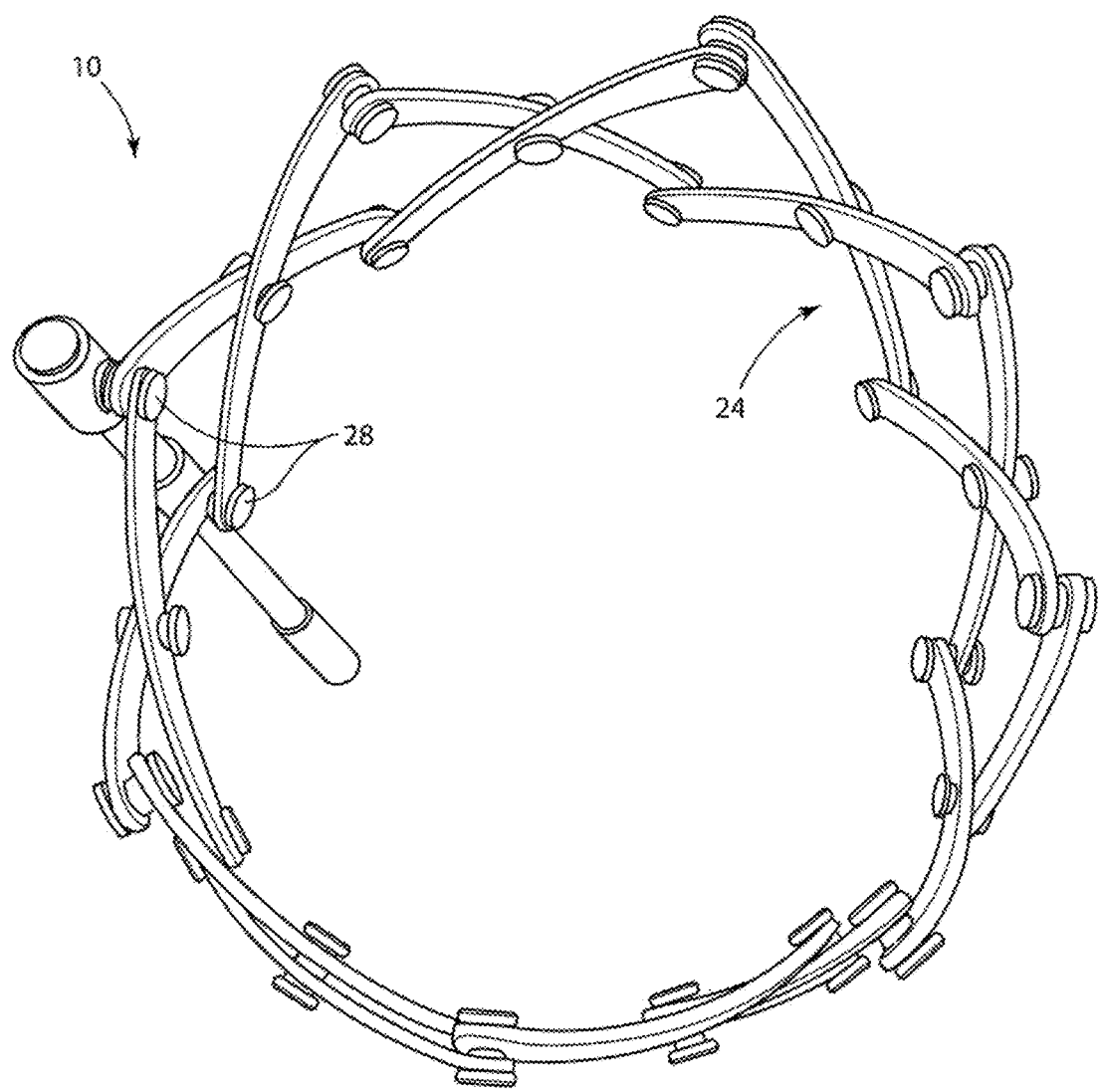
FIG. 2 is a top view of the identity shielding device with the framework.

Turning now to FIG. 2, foldable framework 24 is generally arranged in an annular configuration. As shown in FIG. 2, foldable framework 24 defines a collapsible tube open at the first and second ends. While foldable framework 24 is generally arranged in an annular configuration, it is envisioned that foldable framework 24 may be arranged in any number of other configurations, for example, in configurations similar to a box, triangle, half round, or even irregular polygon shapes.

Figure 3:
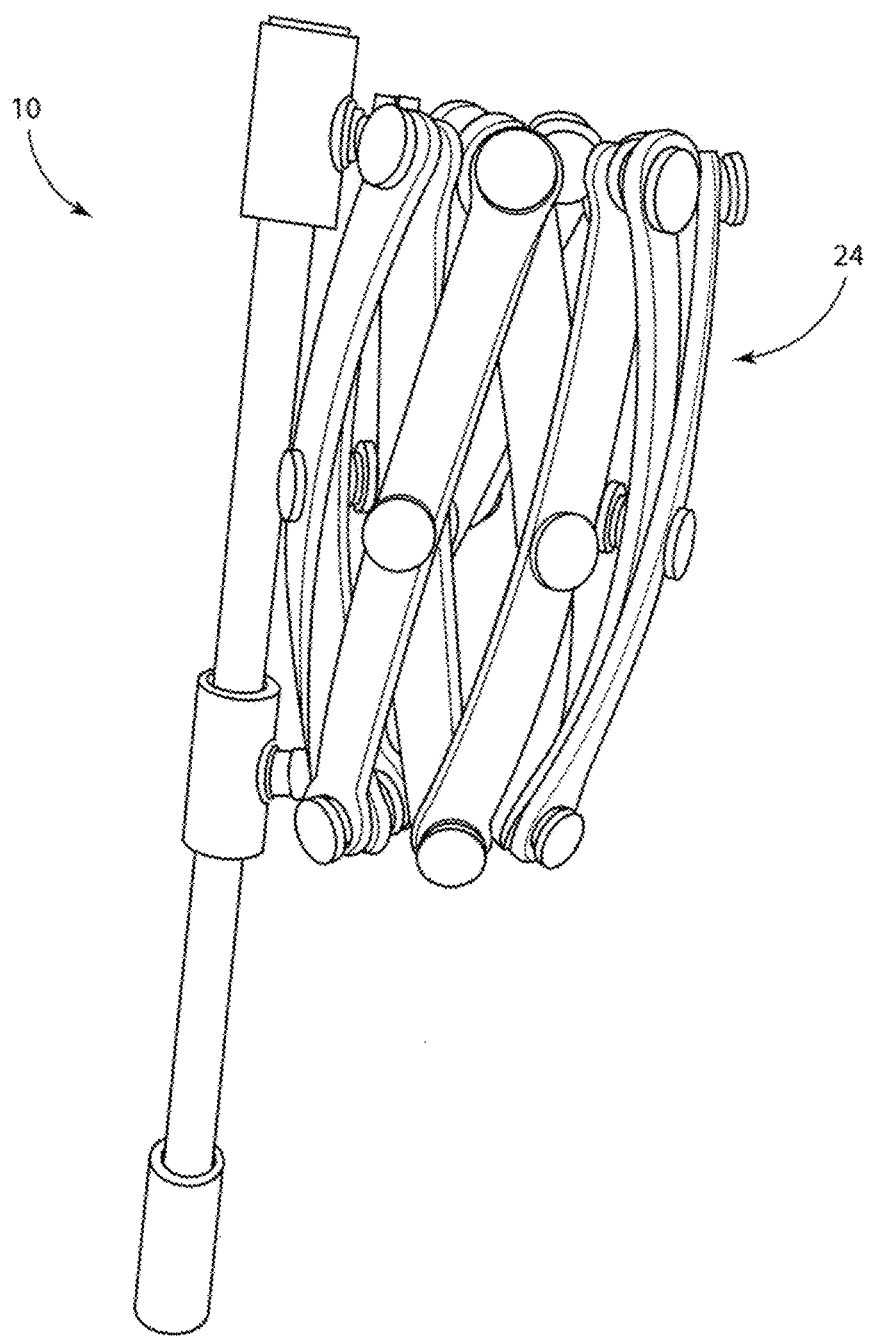
FIG. 3 is a side view of the identity shielding device with the foldable framework collapsed.
Figure 7:
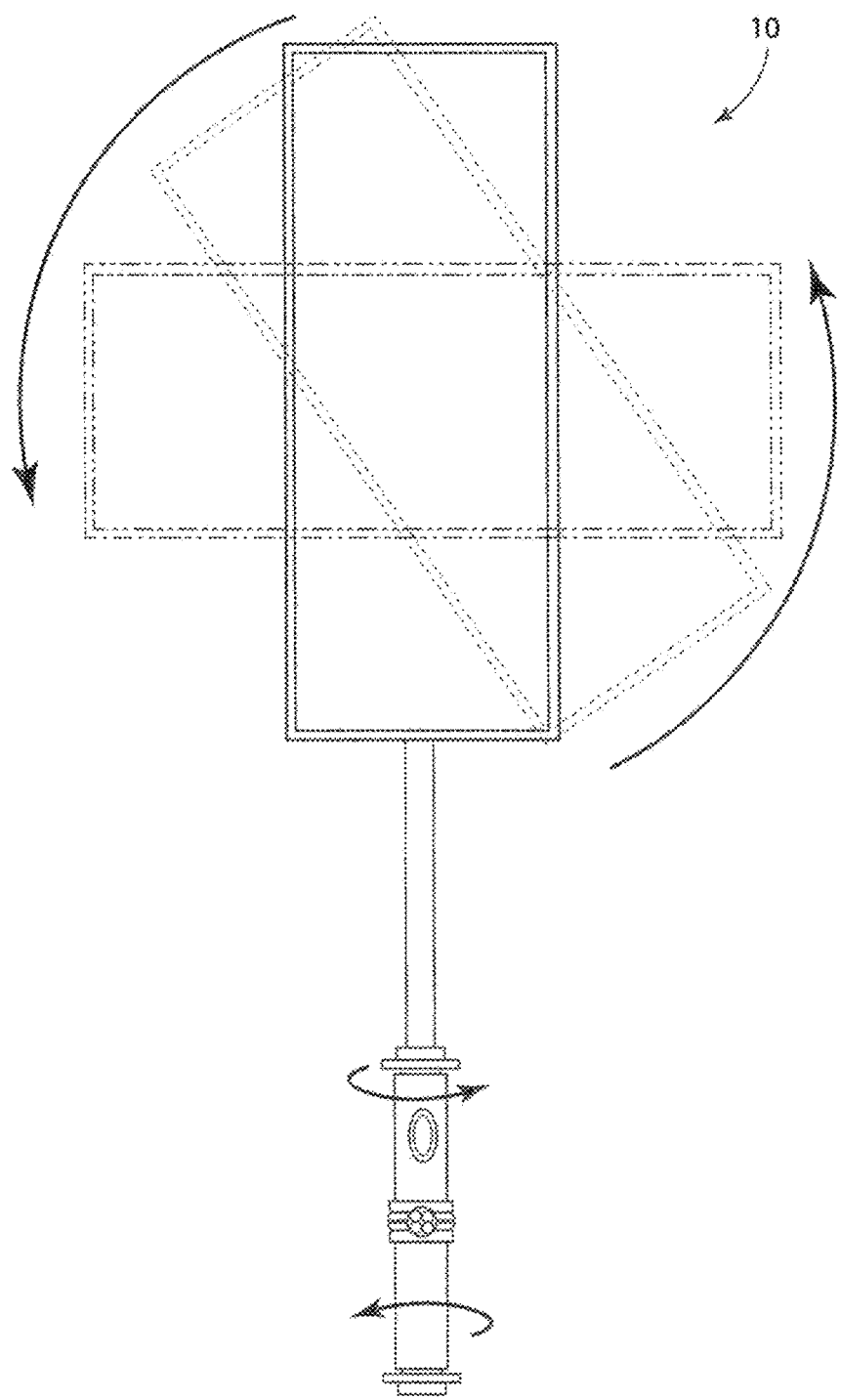
FIG. 7 is a side view of an alternate embodiment of the identity shielding device with the foldable framework collapsed.
Figure 8:
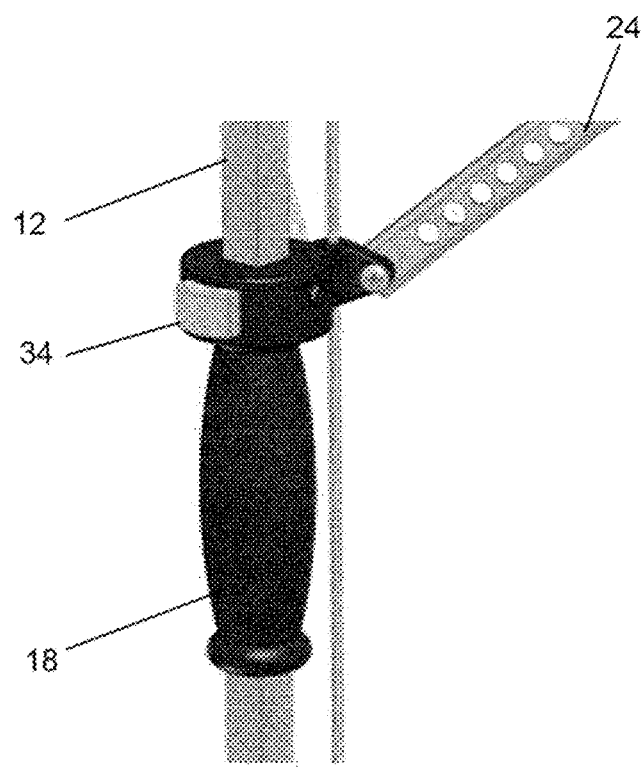
FIG. 8 is a view of an alternate embodiment of an upper handle of the identity shielding device.
Figure 9:
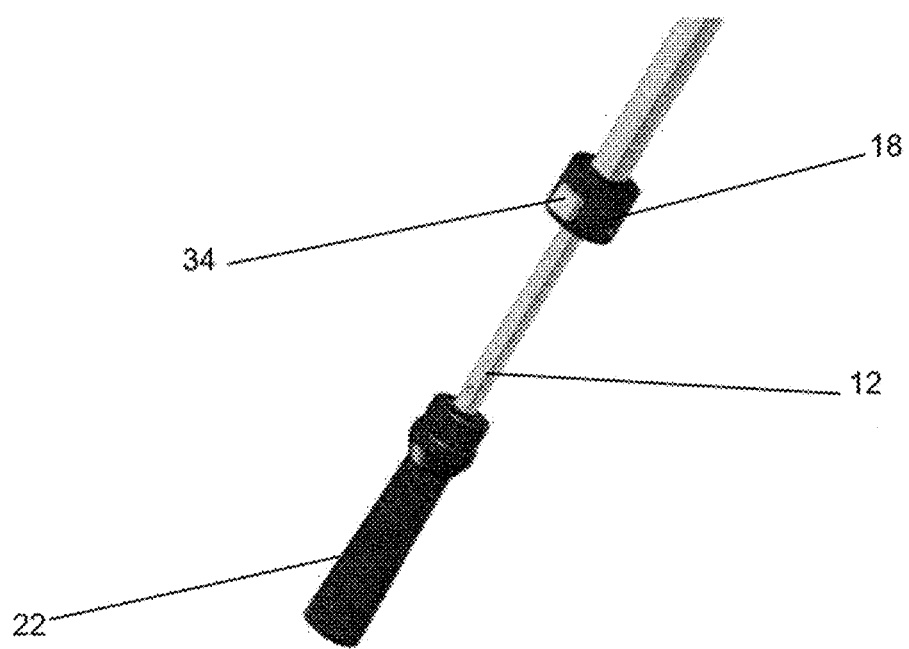
FIG. 9 is a view of an alternate embodiment of an extended position of a lower handle of the identity shielding device.
Figure 10:
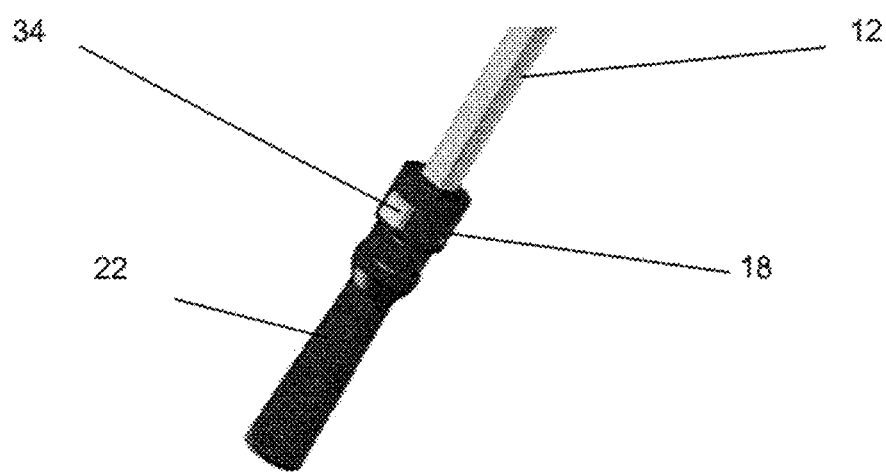
FIG. 10 is a view of an alternate embodiment of a collapsed position of a lower handle of the identity shielding device.
Figure 11:
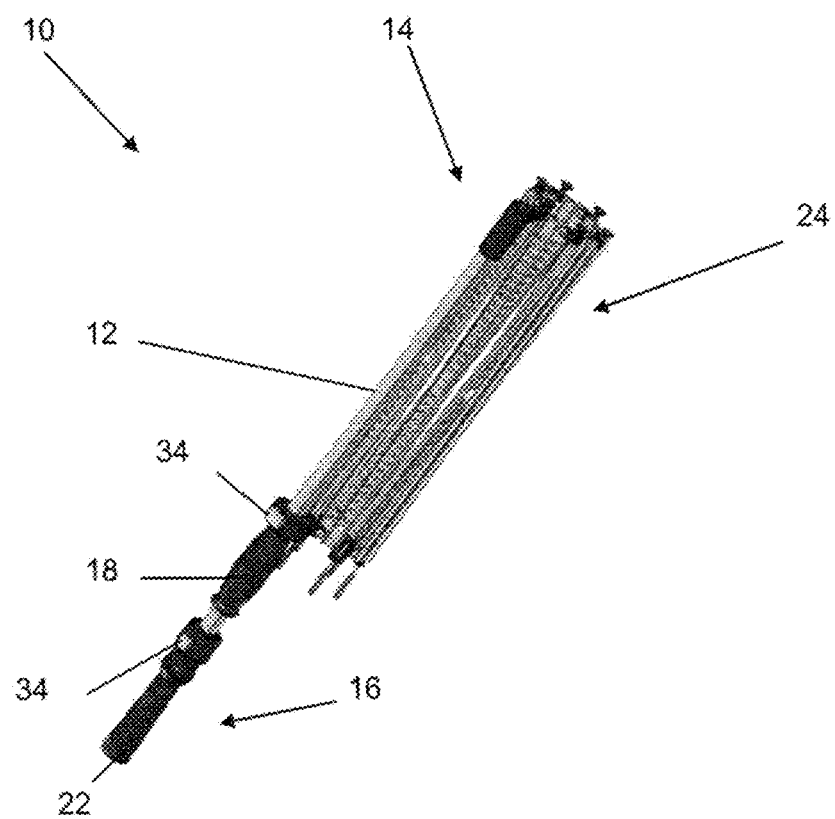
FIG. 11 is a closed isometric view of an alternate embodiment of the identity shielding device.
Figure 12:
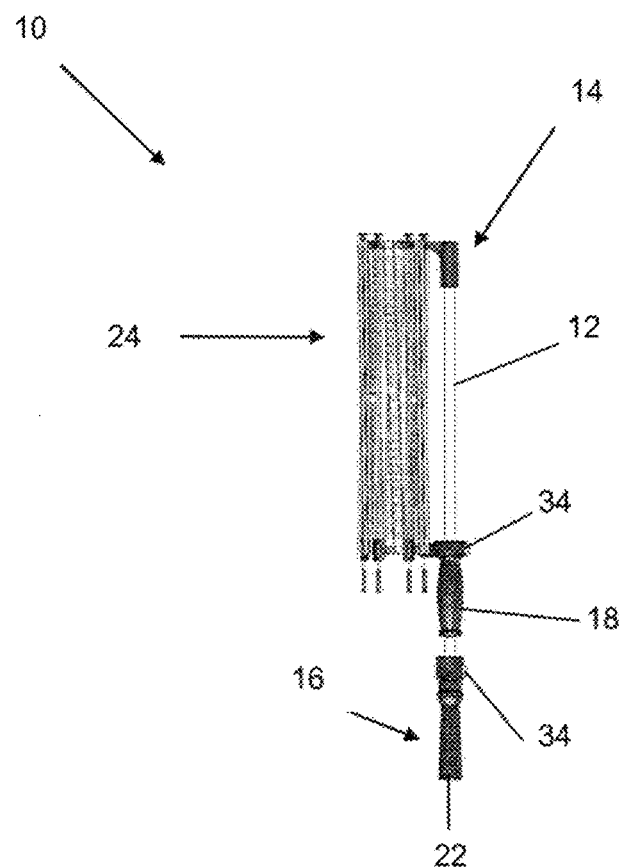
FIG. 12 is a closed side view of an alternate embodiment of the identity shielding device.

As shown in FIG. 3, the foldable framework 24 is designed to close, collapse, or retract upon itself. It is envisioned that when foldable framework 24 is collapsed, or retracted, the user of the identity shielding device 10 may more easily transport the device 10. As shown in FIG. 7, in alternate embodiments foldable framework 24 may be angular instead of annular. In these instances, foldable framework 24 may collapse upon itself, and rotate to align with shaft 12 and sliding splint 18 for easy storage.

Returning now to FIG. 1, the foldable framework 24 is comprised of a plurality of ribs 26. Each rib 26 terminates in a grommet or eyelet (not shown). To create the foldable framework 24 the ribs 26 are positioned with the grommet of one rib 26 on top of the grommet of another rib 26. A fastener 28 is then threaded through the two grommets to fix the ribs 26 together. A fastener 28 is also used to affix the ribs 26 to the sliding splint 18 and the first end 14. As shown, the ribs 26 are generally arranged in an overlapping fashion. Additional fasteners 28 may be used to affix the two ribs 26 to each other where they overlap for stability. As previously disclosed, in this embodiment, the ribs 26 are arranged annularly.

Fasteners 28 are used to rotatably affix the ribs 26 together. In one embodiment, the fastener 28 used may be a pin. In an alternate embodiment, the fastener 28 used may be a press stud. In still other embodiments, the fastener 28 used may be a nut and bolt. Still other fasteners 28 known to practitioners in the art may be used without departing from the spirit of the invention.

Regardless of the type of fastener 28 used to affix ribs 26 to each other, to the first end 14 of the shaft 12 and to the sliding splint 18, the ribs 26 are affixed for pivotal movement. The movement of the foldable framework 24 is proportional to the movement of the sliding splint 18. When a user of the identity shielding device 10 moves the sliding splint 18 towards the first end 14 of the shaft 12, there is a corresponding opening, or expanding movement in the identity shielding device 10. Conversely, when the user of the identity shielding device 10 moves the sliding splint 18 towards the second end 16 of the shaft 12, there is a corresponding closing, or collapsing movement in the identity shielding device 10. As previously disclosed, the sliding splint 18 may include means for temporarily affixing the sliding splint 18 to the desired location on the shaft 12, allowing the framework 24 to remain in an extended or a retracted position, as desired by the user.

It is envisioned that shaft 12 and sliding splint 18 are located at the periphery of the foldable framework 24, as shown in FIGS. 1-2. In this embodiment, the foldable framework 24 will surround the user, and he will hold the shaft 12 or handle 22 located on the periphery of the foldable framework 24. However, in alternate embodiments, shaft 12 and sliding splint 18 may be arranged in the center of foldable framework 24. In this embodiment, the foldable framework 24 will still surround the user.

Returning to FIG. 4, a collapsible shield 30 is affixed to the foldable framework 24. In one embodiment the size of the collapsible shield 30 is matched to the dimensions of the foldable framework 24 when it is in the extended, or expanded position. Also, the collapsible shield 30 collapses with the foldable framework 24 as the user maneuvers the sliding splint 18 towards the second end 16 of the shaft 12.

Collapsible shield 30 is may be affixed to the foldable framework 24 by any means known in the art, for example, by adhesives or mechanical means. In some embodiments, collapsible shield 30 may be comprised of a stiff material or a material with stays. In these embodiments, while collapsible shield 30 is affixed to the foldable framework 24, the collapsible shield 30 may extend beyond the framework 24. As previously disclosed, in other embodiments, collapsible shield 30 extends generally to the end of the framework 24.

The collapsible shield 30 is comprised of a semi-opaque material. In a first embodiment, the semi-opaque material may be a variety of thin plastic. In some embodiments, the plastic may be tinted. In still other embodiments, the plastic may be frosted. In yet other embodiments, the plastic may have a pattern contained in or applied to the plastic comprising the collapsible shield 30. In another embodiment, the semi-opaque material may be a fabric material. In some embodiments the fabric may be a chiffon or nylon material. In yet other embodiments the fabric may be a loosely woven material. In yet other embodiments the fabric may be a chiffon, nylon, or loosely woven material with a pattern contained in or applied to the material. In some embodiments the semi-opaque material may be partly comprised of elastic so that the collapsible shield 30 more easily expands and contracts with the foldable framework 24. Finally, in yet other embodiments, the collapsible shield 30 may be comprised of an opaque material, and have a small viewing window inserted in the material so the user may readily see outside of the identity shielding device 10.

The identity shielding device 10 is designed to be easily operated by a user. Therefore, the identity shielding device 10 is comprised of strong, light weight materials. In some embodiments, the shaft 12, sliding splint 18, cap 20, handle 22, ribs 26 and fasteners 28 may be comprised of a light weight metal such as aluminum. In other embodiments the shaft 12, sliding splint 18, cap 20, handle 22, ribs 26 and fasteners 28 may be comprised of a plastic material. In yet other embodiments the shaft 12, sliding splint 18, cap 20, handle 22, ribs 26 and fasteners 28 may be comprised of a variety of metal, composite, carbon fiber, aluminum and plastics. Other materials known to practitioners in the art may be used without departing from the spirit of the invention.

The identity shielding device 10 may be manufactured in a variety of sizes, and both the circumference of the device 10 and the width of the frame may be manufactured in a size sufficient the mask the features of the notable subject which he desires to be hidden from view. In some embodiments the collapsible shield 30 may be sized to cover the head of the notable subject, while in other embodiments the collapsible shield 30 may cover the torso, or even the majority of the body of the notable subject. It is contemplated that the device 10 will be sized to cover an individual user, but in other embodiments the diameter of the identity shielding device 10 may be sufficiently large to cover two or more users.

In use, the user of the identity shielding device 10 will carry and store the device 10 in the retracted, or collapsed position. When the user determines that coverage from photographers is necessary he will extend, or expand, the identity shielding device 10. In a personal sized embodiment, the user will extend and carry the identity shielding device 10 himself so that the identity shielding device 10 may be handheld using the handle 22 while it is carried and being used. In a larger embodiment, a handler will extend and carry the handheld identity shielding device 10 while the notable subject remains within the protective ring of the collapsible shield 30. In still larger embodiments, a handler will extend and carry the identity shielding device 10 while two or more notable subjects remain within the protective ring of the collapsible shield 30. If the user determines that additional coverage is needed, he may affix an optional canopy 32 to the open end of collapsible shield 30 adjacent the first end 14 (shown in FIGS. 5-6).

FIGS. 8-12 depict a further alternate embodiment of the present invention. Here, the sliding splint 18 is shown to include a button 34 that aids a user in positioning the sliding splint 18 on a desired location of the shaft 12 with the assistance of a depressible flange (not shown). Further, the handle 22 may also include a button 34 for the same purposes. Further, the device 10 is shown in a closed isometric view as well as a closed side view.

Figure 13:
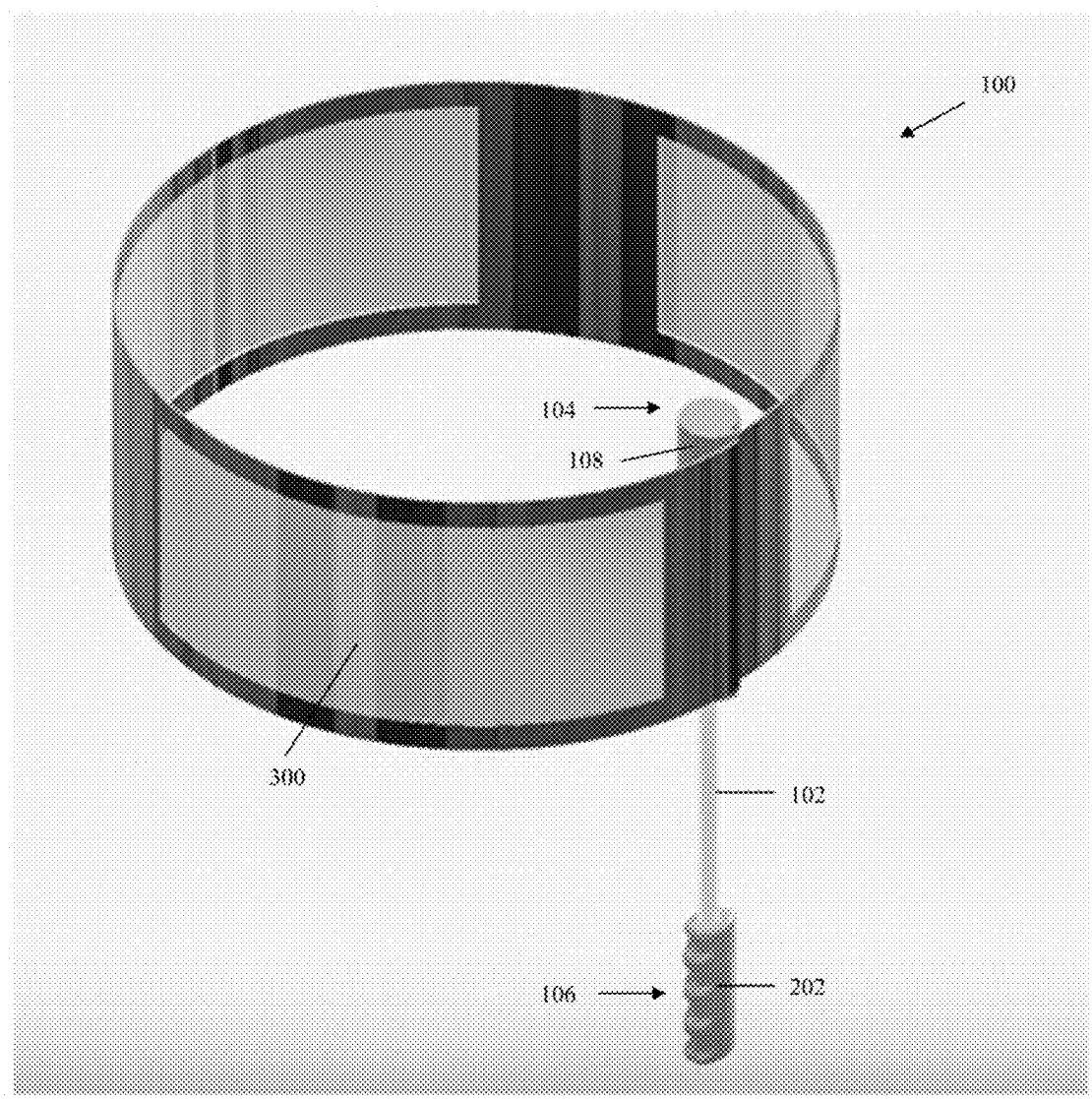
FIG. 13 is a side view of an alternate embodiment of the identity shielding device without the foldable framework collapsed.
Figure 14:
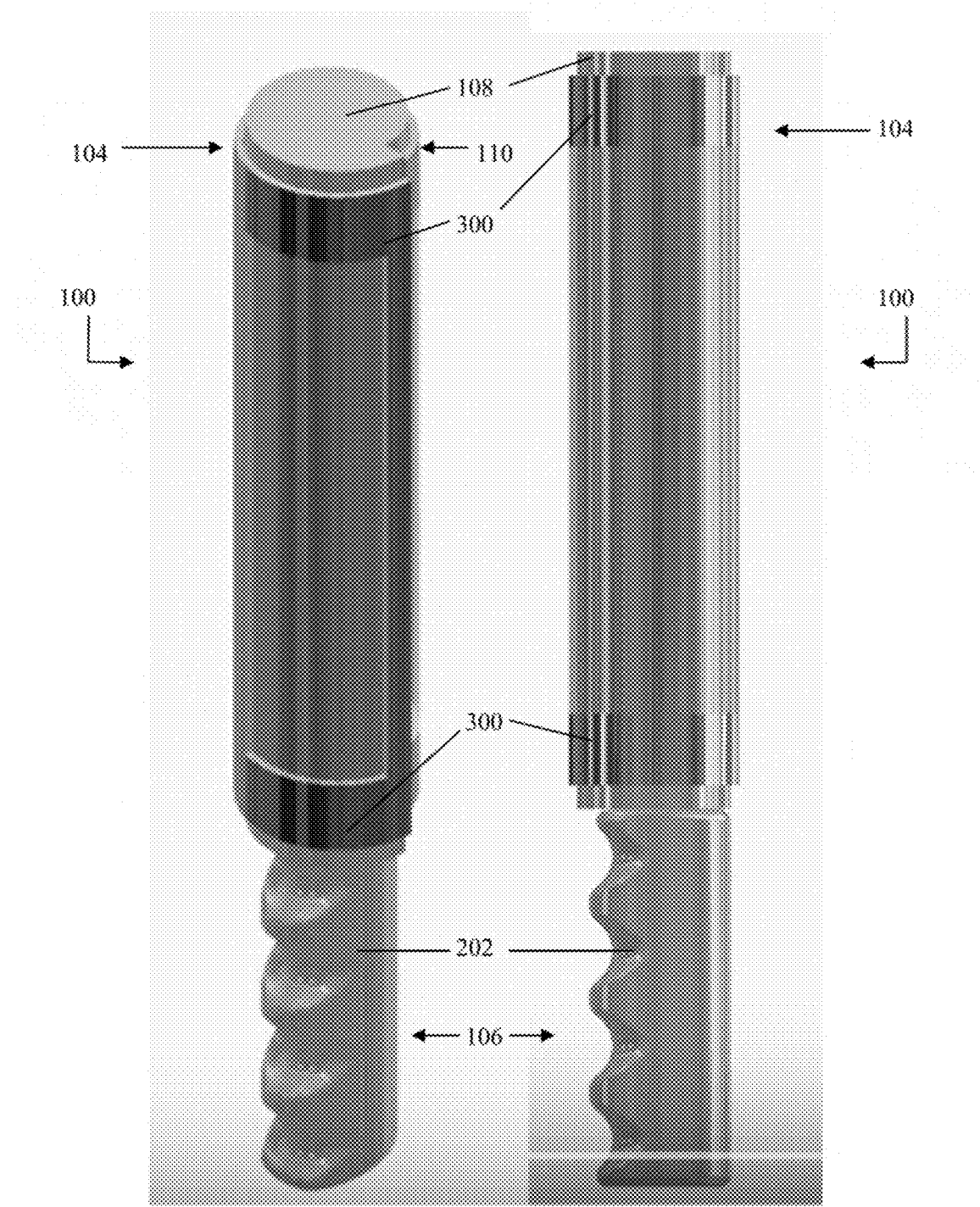
FIGS. 14a and 14b depict isometric and side views, respectively, of the alternate embodiment of the identity shielding device wherein the retractable shield is retracted within the housing (i.e., in a closed position).

FIGS. 13-19 depict yet another embodiment of identity shielding device 100. FIG. 13 shows an isometric side view of the identity shielding device 100 having a retractable shield 300 in the extended, expanded position (i.e., an open position). FIG. 13 also depicts identity shielding device 100 having a shaft 102 with a first end 104 and a second end 106, as well as a retractable shield housing 108 located at first end 104. In some embodiments, second end 106 has a handle 202 affixed to the shaft 102. FIGS. 14*a* and 14*b* depict isometric and side views, respectively, of the identity shielding device 100 wherein the retractable shield 300 is retracted within housing 108 so that it is in a closed, unexpanded, and/or un-extended position. As discussed below, a user may manually open or close the retractable shield 300 by sliding shaft 102 away from housing 108 (as depicted in FIG. 13) or into housing 108 (as depicted in FIGS. 14*a* and 14*b*).

Figure 15:
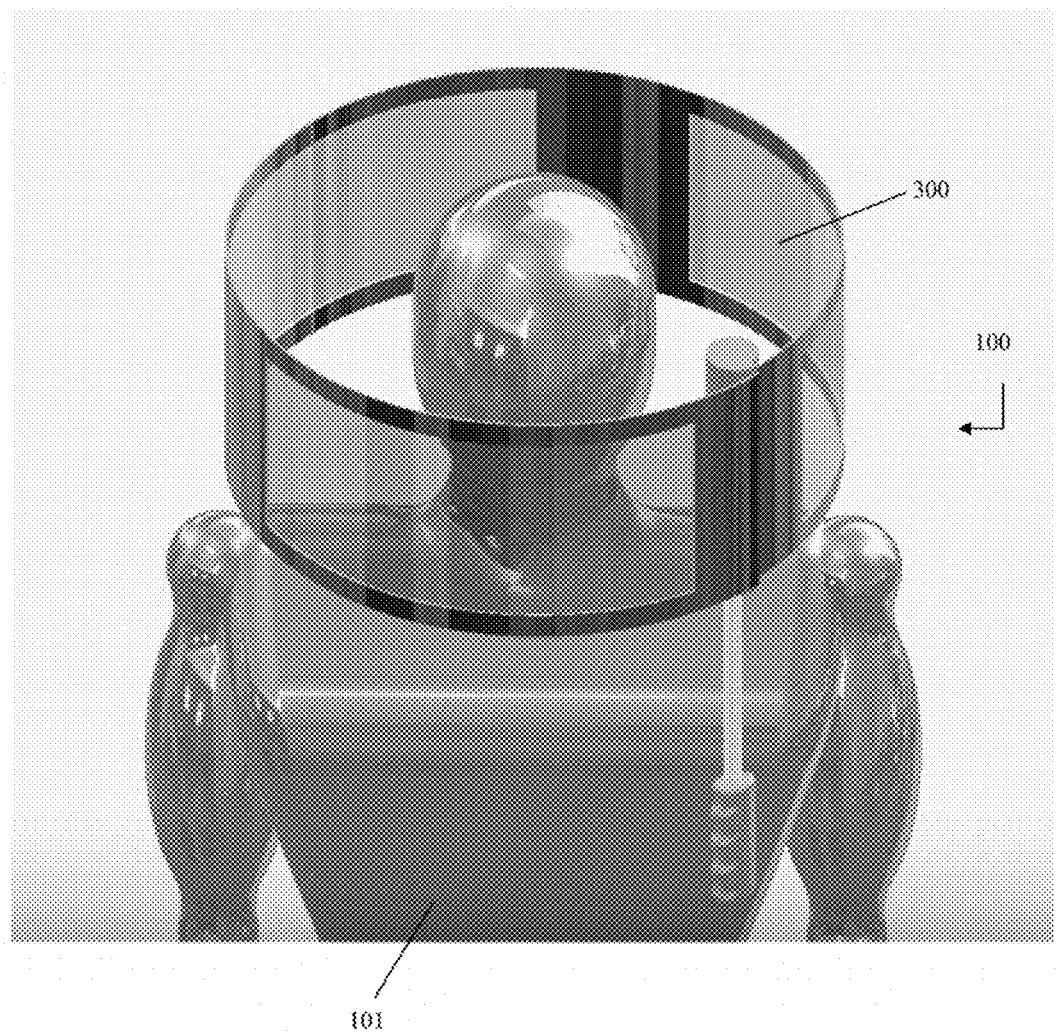
FIG. 15 depicts an individual using the alternate embodiment of the identity shielding device so as to obscure his or her identity.

FIG. 15 depicts an individual 101 using the identity shielding device 100 so as to obscure their identity. Here, retractable shield 300 is depicted in the extended, "open" position such that it forms a circumferential barrier (e.g., in the shape of an open cylinder) around an individual's head with an opening at the top and bottom. The shield 300 may be made from numerous materials, including known sunglass lens materials, and therefore may have properties such as semi-opaque, polarized, and/or have a mirrored exterior surface. Visibility through the shield 300 is limited (i.e., the shield 300 has one-way-visibility), meaning the individual 101 therein may clearly see through the shield 300 so as safely navigate through crowds and other spaces, but third parties outside of the shield's 300 perimeter may not see the individual's 101 face therein. For example, the exterior of the shield 300 may be tinted, mirrored, or have some other privacy film so as to impair a third party's ability to identify the individual 101. Furthermore, the shield 300 may have a natural curvature, which, when coupled with its rigidity, permits the shield 300 to form a perimeter around an individual's 101 head when in the extended or open position without a framework, as depicted. This natural curvature also aids the shield's 300 ability to be retracted when privacy is not needed by rolling or retracting the shield 300 into the housing 108. The shield 300 need not have a natural curvature to form a cylindrical shield around a user, however. For instance, the shield 300 could be made from a material that does not have a natural curvature but, rather, the curvature could be imparted by a small frame, for example, a wire disposed on a surface or imbedded within the film or the film composite, where the wire has a "memory" or other pre-disposed "condition" that correlates to a certain curvature.

Figure 16:
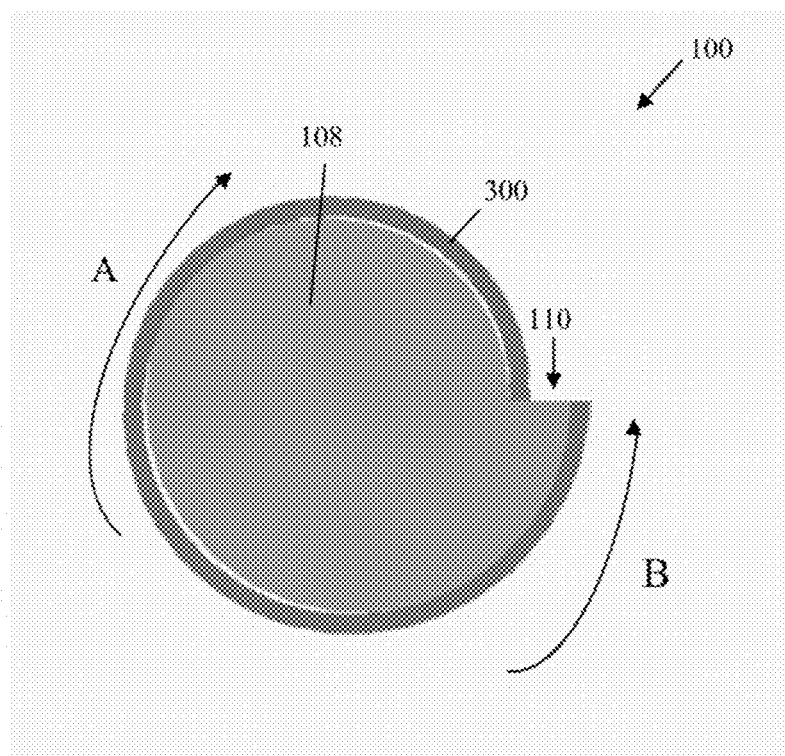
FIG. 16 depicts a top view of the alternate embodiment of the identity shielding device when in a closed position.
Figure 17E:
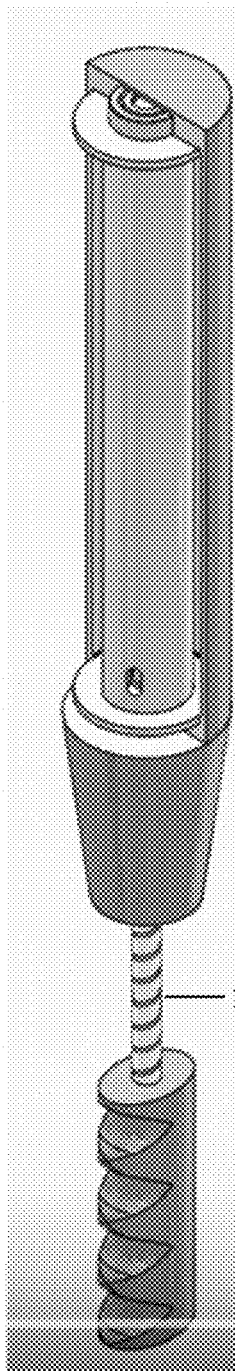
Figure 17F:
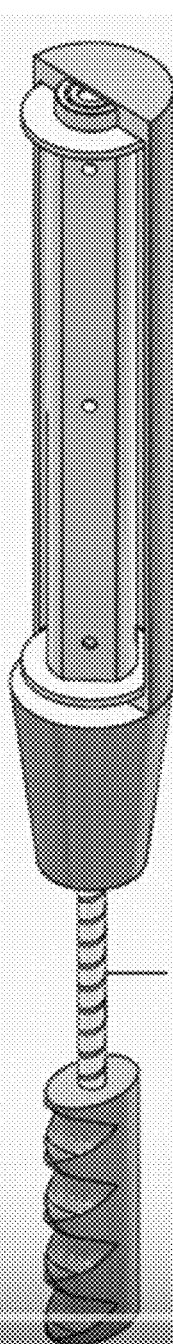
Figure 17G:
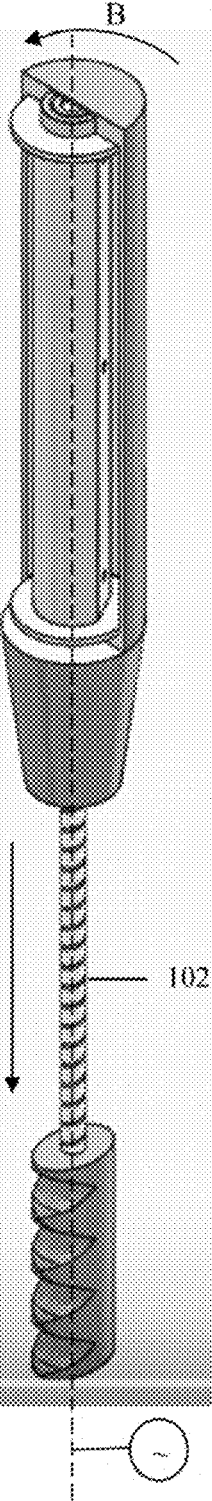

When not in use, the retractable shield 300 will be in a closed position. This closed position depicted in FIGS. 14*a*, 14*b*, 16, 17*a*, and 19; however, FIGS. 14*a* and 16 provide the best representation the housing opening 110 through which the shield 300 will travel when either the open or closed positions are engaged. FIG. 16 depicts a top view of housing 108 where shield 300 is retracted into a closed position. In this closed/retracted position, its natural curvature facilitates the shield 300 wrapping around the exterior surface of housing 108, extending into the housing 108 at the opening 110, and continuing to be rolled around a rotor/shaft 112 within an inner cavity of housing 108 (not depicted). This natural curvature also facilitates the shield forming a circumferential shield around an individual without an internal frame structure. When privacy is not desired, an individual may engage the closed position of the identity shielding device 100 by pushing the shaft 102 into the housing 108 in the direction indicated by arrow X, which in turn causes a axel/shaft/rotor 112 to rotate in a clockwise direction (see arrow A), thereby retracting shield 300 and wrapping it around the rotor 112. When privacy is desired, however, the shield 300 may be unrolled from the rotor 112 within the housing 108 and opened by pulling the shaft 102 away from the housing 108 in the direction indicated by arrow Y. Extending the shaft 102 away from housing 108 in direction Y causes rotor 112 to rotate in a counter-clockwise direction (see arrow B), thereby unrolling shield 300 from the rotor 112 and expanding the shield 300 into its expanded position as depicted in FIG. 15. The shield's 300 natural curvature and rigidity permit it to maintain a suitable barrier from exterior third parties without the need of a supporting frame structure. It will be understood, however, that the foregoing description of movements in directions A, B, X, and Y are merely one example, and that, for example, axially movement in direction X may instead result in rotation in direction B and so forth.

FIGS. 17a-17g are cut-away illustrations of the rotor 112 inside cavity of shield housing 108, showing incremental depictions of the position of rotor 112 and shaft 102 within housing 108 as the identity shielding device 100 is maneuvered from a closed position (see FIG. 17a) to an open positions (see FIGS. 17b-17g). The rotor 112 is the base upon which one end of shield 300 is mounted, and is generally cylindrical and hollow. The shield 300 may be affixed to the rotor 112 by any means known in the art, for example, by adhesives or mechanical means. In one embodiment, the rotor 112 is a rounded along its entire perimeter. However, in the illustrated embodiment, the rotor 112 is rounded for most of its perimeter, but has a flat surface or flat 113 along a portion of its perimeter, which extend the entire length of the rotor 112, and comprises the rotor surface on which the shield 300 is mounted. The rotor 112 is positioned within housing 108 such that its longitudinal axis Θ is parallel and coaxial with shaft 102. Further, the rotor 112 is mounted within housing 108 such that it is able to rotate in either a clockwise direction A or counter-clockwise direction B. Thus, top hub assembly 114 is connected to one end of the rotor 112 (i.e., the top end) and fitted into a notch at the top end 116 of housing 108, thereby permitting clockwise and counter-clockwise rotation about longitudinal axis Θ as depicted.

The other end of the rotor 112 (i.e., the bottom end) is also configured to rotate about longitudinal axis Θ in either direction A or direction B. This rotation is achieved by mounting the bottom end of rotor 112 to a hub (e.g., rotor hub 120) that rotates within the housing 108; the rotor hub 120 is also configured to rotate in a clockwise and counter-clockwise with respect longitudinal axis Θ. The rotor 112 is thus rotatably mounted to the top end 116 of housing 108 via top hub assembly 114 and rotatably mounted to the bottom end 118 of housing 108 via the rotor hub 120.

FIGS. 18a-18c are various representations of one embodiment of the bottom rotor hub 120 (without the rotor 112), wherein rotor hub 120 is at various radial alignments do to the position of shaft 102, which travels through the center thereof. Thus, the rotor hub 120 should be designed with central opening extending along the longitudinal axis Θ, and having sufficient diameter to engage the shaft 102 as detailed below. Further, once so configured, the rotor hub 120 will rotate around shaft 102 as shaft 102 travels axially there through. It will be appreciated that the rotor hub's 120 various radial alignments determine the extent to which the shield 300 is extended away from the surface of the housing 108 (i.e., how far the shield 300 is opened). For example, FIGS. 18a-18c depict the various positions of shaft 102 with respect to the hub's 120 radial orientation as the device is being maneuvered from an open to a closed position. Thus, these illustrations depict the interface between the shaft 102 and the rotor hub 120 as the shield 300 is being retracted within the housing 108 (i.e., the closed position). It will be appreciated however, that the shaft 102 and the rotor hub 120 have a similar interaction as the shield 300 is extended out of the housing 108 into its open position. FIG. 19 depicts the device where the shaft 102 has been inserted through the rotor hub 120 and into the housing 108 so as to retract the shield 300 within the housing 108. Thus, FIG. 19 depicts the orientation of the shaft 102 relative to the rotor hub 120 when the shield 300 is in the closed position.

FIGS. 18a-18c and 19 best depict how the shaft's 102 axial movement through the center of the rotor hub 120 result in extension or retraction of the shield 300. These figures depict the rotor hub 120 being configured to rotate in a clockwise and counter-clockwise with respect longitudinal axis Θ. These figures illustrate an embodiment where both the rotor hub 120 and the bottom end 118 of housing 108, along with the rotor 112, are hollow so as to permit shaft 102 to be inserted there through. Here, the rotor 112, the shaft 102, and the hollow cavities of the bottom end 118 and the rotor hub 120 are all coaxial with the longitudinal axis Θ. In use, axial movement of shaft 102 along longitudinal axis Θ in either direction X or Y causes the bottom hub 120 to rotate in a clockwise direction A or counter clockwise direction B, respectfully. The axial movement of shaft 102 translates into rotational movement of the bottom hub 120 via a screw system, for example, where both the external surface of the shaft 102 and the surface of the bottom hub's 120 inner cavity are threaded so as to comprise a roller screw system. Other screw systems may be utilized, for example, a planetary roller screw system or satellite roller screw system. The skilled artisan will appreciate, however, that in other embodiments (not illustrated), hub 120 is not utilized and, instead, the rotor 112 is configured with an inner longitudinal cavity that extends along the longitudinal axis Θ so as to receive the shaft 102 in the same manner as taught with regard to the rotor hub 120.

The foregoing description has been provided with regard to a device that is actuated by an individual to engage or disengage the privacy screen, whether that individual is sliding a sliding splint 108 along a shaft, or sliding a shaft 102 within a housing 108. However, it will be appreciated that in other embodiments of the foregoing devices, motor actuators may be utilized to automatically engage or disengage the shield. For example, a motor may be installed within housing 108 that automatically rotates the rotor 112 and/or the rotor hub 120, and thereby drives the shield 300 to expand or retract, instead of axial shaft 102 movements. Here, the shaft 102 may still have telescoping capabilities, but its position relative to the housing 108 will not impact the orientation of the shield 300. Such automatic motor could be powered by disposable or rechargeable batters, or even powered by solar power, and actuated via a button disposed either on the shaft 102 or housing 108.

The foregoing provides a description of an identity shielding devices 10 and 100, a description of how the identity shielding devices 10 and 100 are arranged, and how the identity shielding devices 10 and 100 are used. However, this description illustrates only the principles of the invention. Since modification and change will readily occur, it is not desired to limit the invention to the exact construction and operation shown and described herein. Accordingly, all suitable modifications and equivalents are within the scope of this invention.

Although the present invention has been described above in detail, the same is by way of illustration and example only and is not to be taken as a limitation on the present invention.

What is claimed is:

1. An identity shielding device comprising
a shield having a mounting end, a top edge, a bottom edge, and terminal end;
a housing with a rotor mounted therein, the rotor being capable of rotating in a first and second direction about a central axis, the mounting end of the shield being attached to the rotor, wherein the rotor may rotate in either the first or second direction about the central axis thereby extending or retracting the terminal end of the shield from the housing, wherein the top edge defines a top opening and the bottom edge defines a bottom opening when the shield is extended from the housing, wherein a distance between the top edge and the bottom edge of the shield when extended from the housing is the same as when retracted into the housing, and wherein the housing further comprises a housing opening through which the shield may extend or retract; and
a shaft extending from the housing along the central axis.

2. The identity shielding device of claim 1 further comprising an actuator that rotates the rotor, wherein the actuator is selected from the group consisting of actuators, electric motors, and roller screw systems, and any combination thereof.

3. The identity shielding device of claim 2, wherein the actuator comprises the shaft and the rotor being assembled in a roller screw arrangement, whereby an axial movement of the shaft along the central axis and into and through an inner cavity of the rotor causes the rotor to rotate in either the first or second direction about the central axis thereby extending or retracting the shield from the housing.

4. The identity shielding device of claim 3 further comprising a rotor hub that interconnects the rotor to the housing, wherein the rotor hub has a hollow cavity extending along the central axis so as to receive the shaft and rotate in response to axial movement of the shaft, and thereby causes rotation of the rotor which is attached thereto.

5. The identity shielding device of claim 1 wherein a first end of the shaft further comprises a handle.

6. The identity shielding device of claim 1 wherein the shield comprises a reflective material.

7. The identity shielding device of claim 1, wherein the shield comprises a semi-opaque material.

8. The identity shielding device of claim 1 wherein the shield when extended into an extended or open position is a cylindrical shield.

9. The identity shielding device of claim 8 wherein a top edge of the cylindrical shield defines a perimeter, and wherein a length between the open top and open bottom of the cylindrical shield is at least 25 percent of a maximum distance between two furthest apart points on the perimeter.

10. An identity shielding device comprising
a shield having a mounting end, a top edge, and terminal end;
a housing with a rotor mounted therein, the rotor being capable of rotating in a first and second direction about a central axis, the mounting end of the shield being attached to the rotor, and
a shaft having a first and a second end, the first end extending into a bottom side of the housing and into the rotor along the central axis, wherein an axial movement of the shaft along the central axis rotates the rotor in either the first or second direction about the central axis, which causes the terminal end of the shield to extend or retract from the housing,
wherein the top edge defines a top opening and the bottom edge defines a bottom opening when the shield is extended from the housing.

11. The identity shielding device of claim 10 further comprising a rotor hub that interconnects the rotor to the housing, wherein the rotor hub has a hollow cavity extending along the central axis so as to receive the shaft and rotate in response to axial movement of the shaft.

12. The identity shielding device of claim 10 wherein the housing further comprises a housing opening through which the shield may extend or retract.

13. The identity shielding device of claim 10 wherein the first end of the shaft further comprises a handle.

14. The identity shielding device of claim 10 wherein the axial movement of the shaft is actuated by a motor.

15. The identity shielding device of claim 10 wherein the shield comprises a reflective material.

16. The identity shielding device of claim 10, wherein the shield comprises a semi-opaque material.

17. The identity shielding device of claim 10 wherein the shield when extended into an extended or open position is a cylindrical shield.

18. The identity shielding device of claim 17 wherein a top edge of the cylindrical shield defines a perimeter, and wherein a length between the open top and open bottom of the cylindrical shield is at least 25 percent of a maximum distance between two furthest apart points on the perimeter.

19. A handheld identity shielding device comprising:
a shaft having an upper end and a lower end
a rigid shield member having a retracted position and an extended position, the shield member creating a substantially closed periphery defining an interior space having an open top and an open bottom at least when in the extended position;
a means for attaching the shield member to the shaft; and
a means for rotating the shield member between the retracted position and the extended position,
wherein the interior space defined by the shield member is lacking protrusions extending into the interior space when in the extended position, and
wherein the handheld identity shielding device is adapted to be carried by a person when in use.

* * * * *